No. 655,520.  
P. SCHULTZE.  
MARINE VELOCIMETER.  
(Application filed Aug. 22, 1899.)  
Patented Aug. 7, 1900.
(No Model.)
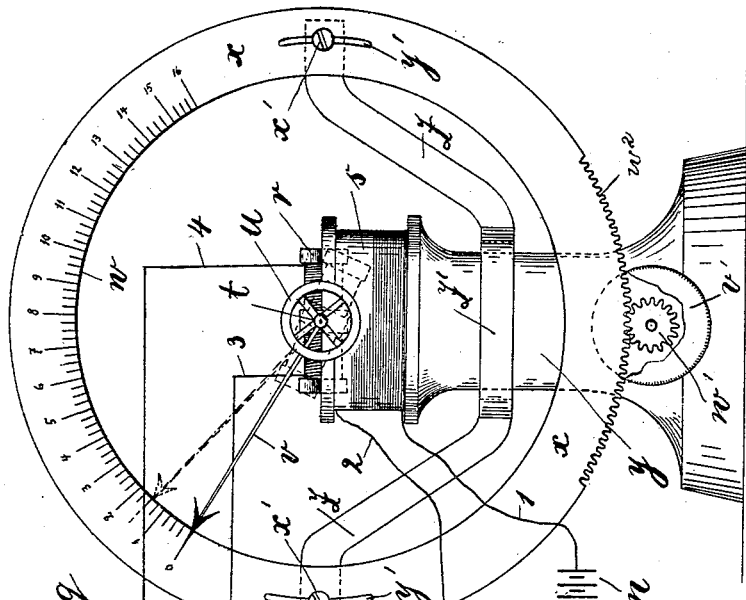
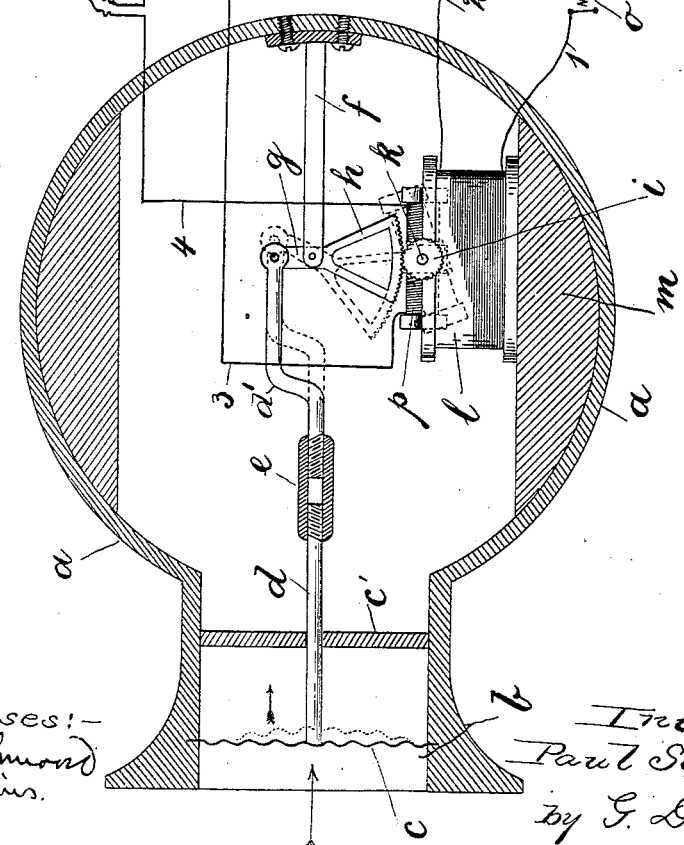
Witnesses:  
Jas. A. Richmond  
Jas. C. Hopkins.
Inventor:-  
Paul Schultze  
by G. Dittmar  
his Attorney

UNITED STATES PATENT OFFICE.

PAUL SCHULTZE, OF BERLIN, GERMANY.

MARINE VELOCIMETER.

SPECIFICATION forming part of Letters Patent No. 655,520, dated August 7, 1900.

Application filed August 22, 1899. Serial No. 728,120. (No model.)

*To all whom it may concern:*

Be it known that I, PAUL SCHULTZE, a subject of the German Emperor, residing at Berlin, in the German Empire, have invented certain new and useful Improvements in Marine Velocimeters; and I do hereby declare the following to be a full, clear, and exact description of the invention, such as will enable others skilled in the art to which it appertains to make and use the same.

This invention relates to measuring instruments and devices, and more particularly to means for indicating the speed of vessels, the objects being to simplify the construction of instruments of this character, and thus render them less susceptible to damage, reduce their cost to the minimum possible, and in general to produce a speed register and indicator superior in every respect to the present state of the art. These and other objects I attain by the mechanisms, details, and circuits to be presently described and as will more fully appear by reference to the accompanying drawings, wherein—

Figure 1 is a sectional view taken through the measuring instrument, showing the general arrangement of the membrane and parts immediately coacting therewith; and Fig. 2 is a side elevation of the indicator and controlling mechanism.

Referring to the drawings, the parts will readily be recognized as consisting of a measuring instrument to be attached to the ship's side below the water-level and an indicator in electrical connection therewith located above the deck. The former comprises a housing $a$ of the general shape shown, having an extended opening $b$, which is closed near its outer end by a membrane or diaphragm $c$. Said opening is also closed near its inner end by a plate $c'$, which is centrally apertured to permit the passage of a rod $d$, connected in any suitable manner with the diaphragm. The rod $d$ is threaded at its opposite end, where it is connected to a bent arm $d'$ by a threaded sleeve $e$ for purpose of adjustment. An arm $f$ is secured to housing $a$ in a horizontal plane with rod $d$ and affords a pivotal bearing for a swinging arm $g$, loosely connected to arm $d'$ and having a segmental portion $h$. The curved portion of segment $h$ is provided with rack-teeth, which mesh with a pinion $i$, mounted upon a shaft $k$ transversely of a spool $l$, mounted upon a non-conducting base $m$ and wound with wire 1 and 2, forming a primary coil, which is in circuit with a battery and switch $n$ $o$. The shaft $k$ also carries a coil $p$, which is the secondary, the convolutions 3 4 of which are wound at right angles to the winding of the primary, and said coil $p$ is adapted to move freely within the primary 1.

Referring now to the indicator mechanism, Fig. 2, the same will be seen to consist of a pedestal or standard $y$, supporting a primary coil $s$, similar to coil $l$ and in circuit with the latter and with the battery $n$. A collar $z'$ is seen mounted upon the pedestal and has two upwardly-bent arms $z$, each provided with a screw $x'$, serving to support a dial-plate or ring $x$, which is slotted at $y'$ for the purpose. The ring $x$ is provided with suitable graduations, as at $w$, and is provided at its lower periphery with a toothed surface $w^2$, in which meshes a pinion $w'$, mounted upon a common shaft with adjusting-wheel $v'$, whereby the dial-plate can be set at any desired position, limited by the length of the slots $y'$, with respect to the pointer $v$. A shaft $t$ is mounted transversely of the primary coil $s$ and carries a secondary coil $r$ in circuit with the secondary $k$, a telephone or other sounding device being interposed in said circuit, as at $q$.

The operation is as follows: The measuring device is lowered into the water and secured in any suitable manner to the side of the ship in such position that the impact or pressure of the water is thrown upon the diaphragm $c$, and the controller or indicator is mounted on the deck, the bridge, or in one of the cabins. The telephone $q$ and switch $o$ should, essentially, be placed near the controller. Upon closing said switch $o$ and completing the battery-circuit through the two primary coils 1 $s$ it will be apparent that an intermittent current will be set up in the secondary circuit 3 4, the strength of which is dependent upon the number of layers or windings of the coils $p$ $r$, the number of batteries in circuit, and the relative positions of the secondary and primary coils. It will likewise be apparent that when the induction set up in each secondary is of like intensity they will neutralize one another. In other words, when the angle of inclination of the pair of secondary coils with respect to the primary coils is the same the telephone $q$ can be made use of to find the neutral point upon the dial-plate. When the current intensity varies, even to the most infinitesimal extent, a rattling or buzzing noise will be audible in the telephone, which increases the farther the pointer $v$ recedes from the neutral point. To ascertain the position of the secondaries, the wheel $u$ for adjusting the hand or pointer $v$ is turned until the noise in the telephone ceases. The position of the pointer with respect to the graduations upon the dial-plate will then indicate the speed at which the vessel is moving, and the dial can be made to read in miles or knots, as desired.

By referring to Fig. 1 it will be seen that as the speed of the vessel increases the pressure of the water upon the diaphragm will correspondingly increase and the latter will vibrate, as it were, the vibrations being transferred through the medium of the instrumentalities shown upon the sector $h$, which regulates the angle of inclination of the secondary coil $p$.

It is obvious that the neutral position referred to does not necessarily refer to the zero position of the dial-plate, but is intended to represent that condition where the secondaries are of equal intensity and no sound is audible in the telephone.

While I have described the invention with more or less minuteness, I do not care to restrict myself to the exact construction and instrumentalities shown, as same should be limited only as indicated by the scope of the claims. It is also obvious that various changes and modifications may be resorted to without departing from the spirit of the invention. For instance, instead of the telephone $q$ I may employ an incandescent lamp, the automatic lighting and extinguishing of which may be used to indicate the varying intensity of the secondary currents.

Having thus described my invention, what I claim as new, and desire to secure by Letters Patent of the United States, is—

1. A speed-indicator for vessels, consisting of a submerged measuring device having a diaphragm adapted to vibrate under the impact or pressure of the water, a primary coil having a source of electric current, a secondary within the primary adapted to be displaced relatively to the latter, and controlling and indicating mechanism as and for the purpose set forth.

2. In a speed-indicator for vessels, the combination of a submerged measuring device and a controlling-indicator, a diaphragm in the measuring device adapted to vibrate under the impact of the pressure of the water, a primary coil in the measuring device and another primary coil in the controller, both in circuit with a source of electrical energy; secondary coils transversely of and displaceable relatively to the respective primary coils, a signaling device in the secondary circuit, means for transferring the vibrations of the diaphragm upon the first secondary to displace the latter, and a dial-plate, and pointer in the controller, as and for the purpose set forth.

3. In a speed-indicator for vessels, the combination of a submerged measuring device and a controlling apparatus therefor, a diaphragm in the measuring device adapted to vibrate under the impact or pressure of the water, a primary coil in the measuring device and another primary coil in the controller both in circuit with a source of electrical energy; secondary coils transversely of and displaceable relatively to the respective primary coils, a movable dial-plate, a pointer upon a common axis with the secondary in the controller, means for adjusting said pointer and secondary in a predetermined position, and a telephone in the secondary circuit adapted to sound when the intensity of the secondary current varies, substantially as specified.

In witness whereof I have hereunto signed my name, this 8th day of August, 1899, in the presence of two subscribing witnesses.

PAUL SCHULTZE.

Witnesses:
 KURT VON NIESSEN,
 WILLIAM MAYNER.